US012731596B1

(12) United States Patent
Venkata et al.

(10) Patent No.: US 12,731,596 B1
(45) Date of Patent: Sep. 8, 2026

(54) REDUCING UTILIZATION OF A HARDWARE RESOURCE BY A MEDIA STREAM BY DOWNGRADING FROM A HIGH-COMPLEXITY CODEC TO A LOW-COMPLEXITY CODEC TO PROCESS THE MEDIA STREAM

(71) Applicant: Meta Platforms Technologies, LLC, Menlo Park, CA (US)

(72) Inventors: Madhusudan Kinthada Venkata, South San Diego, CA (US); Siddharth Ray, Cupertino, CA (US); Shivank Nayak, Milpitas, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 439 days.

(21) Appl. No.: 17/878,095

(22) Filed: Aug. 1, 2022

Related U.S. Application Data

(60) Provisional application No. 63/257,308, filed on Oct. 19, 2021.

(51) Int. Cl.
*G10L 19/18* (2013.01)
*G06F 1/20* (2006.01)
*G06F 1/3293* (2019.01)

(52) U.S. Cl.
CPC .............. *G10L 19/18* (2013.01); *G06F 1/206* (2013.01); *G06F 1/3293* (2013.01)

(58) Field of Classification Search
CPC ....... G06F 9/5088; G06F 1/3287; H04L 65/61
See application file for complete search history.

(56) References Cited

U.S. PATENT DOCUMENTS 6,535,238 B1 * 3/2003 Kressin .................. H04N 7/141 348/E7.078
11,265,359 B2 * 3/2022 Thomas .................. H04L 65/80
11,968,268 B2 * 4/2024 Dickins .................... H04R 3/12
(Continued)

FOREIGN PATENT DOCUMENTS

CN 210120931 U * 3/2020 ............... A44C 5/00
WO WO-2019213769 A1 * 11/2019 ............ H04M 3/002

OTHER PUBLICATIONS

Marius Marcu et al., “Power-Thermal Analysis of Multimedia Applications” (Year: 2010).*
(Continued)

*Primary Examiner* — Paras D Shah
*Assistant Examiner* — Nadira Sultana
(74) *Attorney, Agent, or Firm* — Morgan, Lewis & Bockius LLP

(57) ABSTRACT

A computer-implemented method for conserving resources on constrained devices may include (i) identifying a media stream on a resource-constrained device, (ii) detecting that a utilization, at least in part by the media stream, of a hardware resource on the resource-constrained device meets a predetermined threshold for hardware resource strain, and (iii) in response to detecting that the utilization meets the predetermined threshold for hardware resource strain, reducing the utilization of the hardware resource by the media stream by downgrading a codec used by the resource-constrained device to process the media stream. Various other methods, systems, and computer-readable media are also disclosed.

19 Claims, 7 Drawing Sheets

(56) References Cited

U.S. PATENT DOCUMENTS

| | | | | |
|---|---|---|---|---|
| 2009/0150893 | A1* | 6/2009 | Johnson | G06F 9/5088 718/104 |
| 2011/0307900 | A1* | 12/2011 | Fatehpuria | G06F 9/50 718/104 |
| 2015/0181208 | A1* | 6/2015 | Park | H04N 19/156 375/240.02 |
| 2017/0200454 | A1* | 7/2017 | Srinivasan | H04L 65/61 |
| 2017/0347057 | A1* | 11/2017 | Slupik | H04N 19/156 |
| 2019/0370927 | A1* | 12/2019 | Frenkel | G06T 1/20 |
| 2020/0019121 | A1* | 1/2020 | Han | A44C 5/14 |
| 2021/0232206 | A1* | 7/2021 | Matula | G06F 1/3287 |
| 2021/0343301 | A1* | 11/2021 | Gao | G10L 19/06 |
| 2022/0383881 | A1* | 12/2022 | Shahbazi Mirzahasanloo | G10L 19/005 |
| 2022/0391167 | A1* | 12/2022 | Liu | G10L 15/22 |

OTHER PUBLICATIONS

Muhammad A. Khan et al., "A Reflective Runtime Environment for Dynamic Adaptation of Streaming Media on Resource Constrained Devices" (Year: 2005).*

* cited by examiner

REDUCING UTILIZATION OF A HARDWARE RESOURCE BY A MEDIA STREAM BY DOWNGRADING FROM A HIGH-COMPLEXITY CODEC TO A LOW-COMPLEXITY CODEC TO PROCESS THE MEDIA STREAM

CROSS-REFERENCE TO PRIORITY APPLICATION

This application claims priority to U.S. Application No. 63/257,308 which was filed on 19 Oct. 2021, the entire contents of which are incorporated herein by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
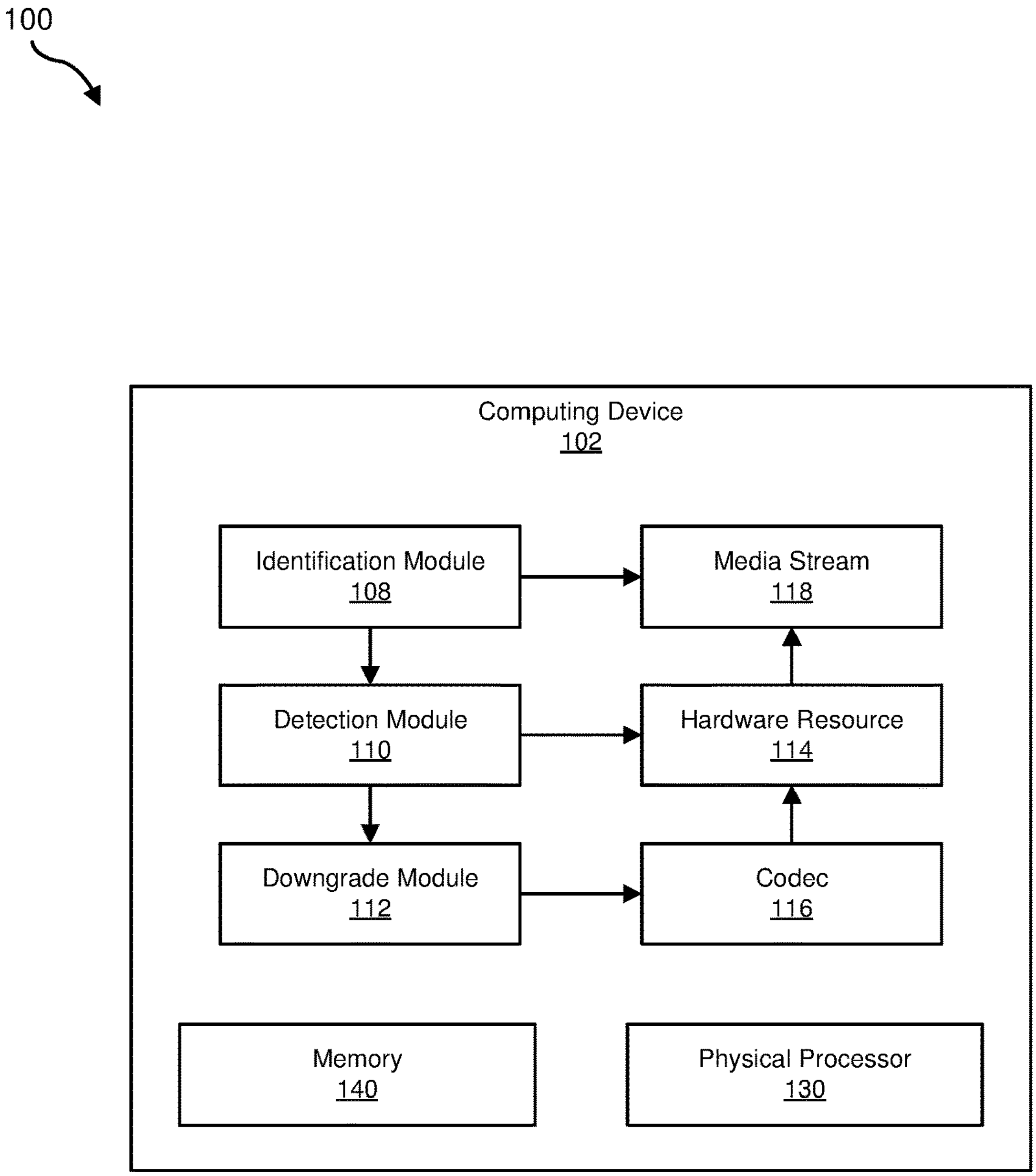
FIG. 1 is a block diagram of an exemplary system for resource conservation on constrained devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods for conserving resources on resource-constrained devices by downgrading codecs used in media streams. Small devices, including wearable devices (e.g., smartwatches), may have limited resources compared to larger devices such as smartphones or laptops. For example, small devices may have limited battery life and/or limited abilities to disperse heat. Voice and video calls and/or other forms of streaming media may demand a large amount of processing power from a small device, potentially causing the device to overheat. To mitigate this problem, the systems described herein may monitor the current thermal state of the device (e.g., via one or more temperature sensors) and, if the device reaches a predetermined heat threshold, downgrade the video and/or audio codec used for the call to a codec that demands less processing power and therefore generates less heat. Additionally or alternatively, the systems described herein may conserve power and/or prolong device battery life by downgrading codec quality in response to reaching a low battery threshold.

In some embodiments, the systems described herein may improve the functioning of a computing device by enabling the computing device to stream media without overheating and damaging hardware and/or causing discomfort for the user. In one embodiment, the systems described herein may improve the functioning of a computing device by enabling the computing device to continue streaming media rather than shutting down due to lack of battery power. Additionally, the systems described herein may improve the fields of wearable devices and/or streaming media by facilitating the streaming of media on wearable devices with limited resources.

Figure 2:
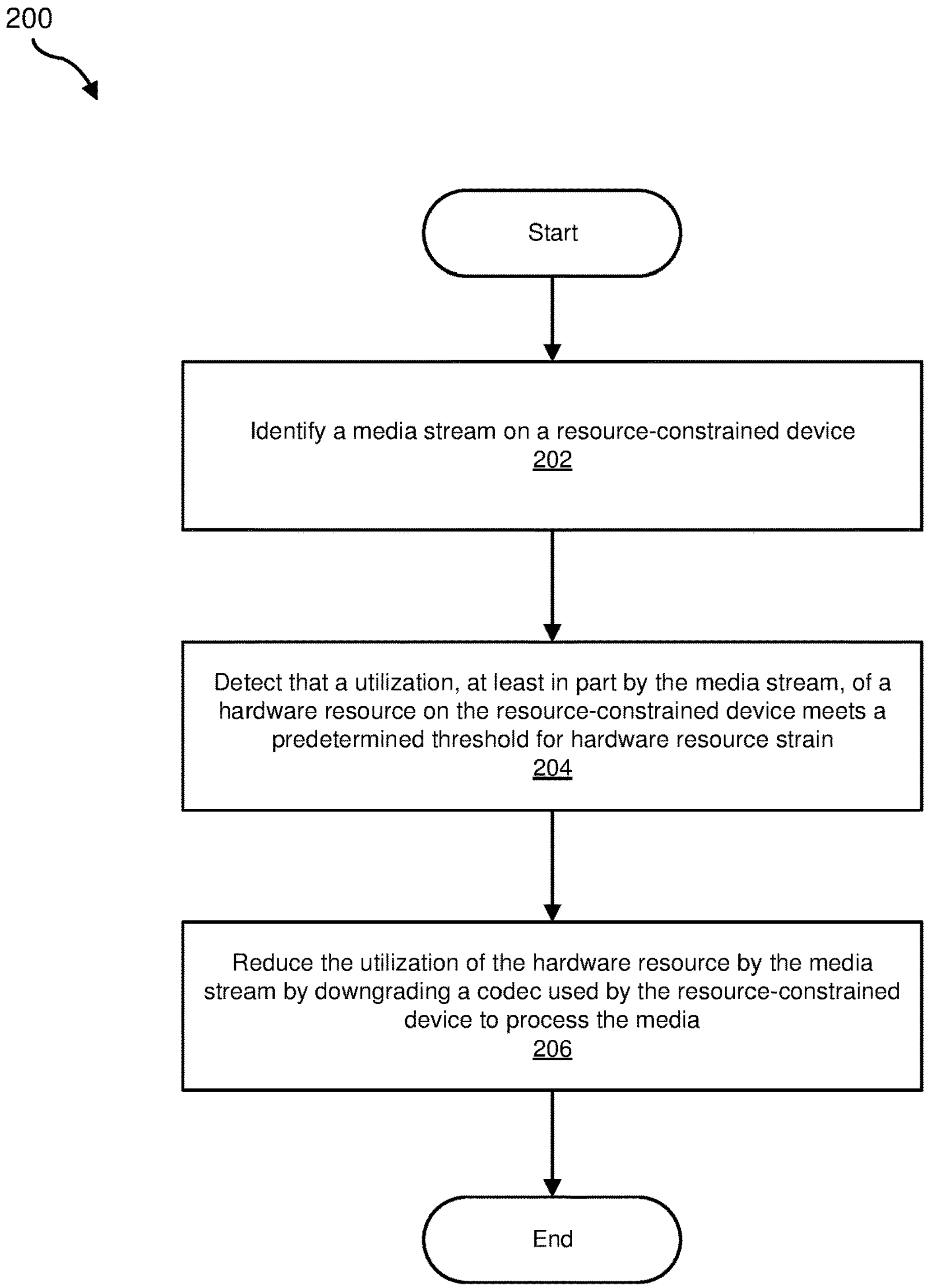
FIG. 2 is a flow diagram of an exemplary method for resource conservation on constrained devices.

The following will provide detailed descriptions of systems and methods for conserving resources on constrained devices with reference to FIGS. 1 and 2, respectively. Detailed descriptions of an example smart watch will be provided in connection with FIG. 3. Detailed descriptions of an example timeline of an audio call between a resource-constrained device and an additional device will be provided in connection with FIG. 4. Additionally, detailed descriptions of an example graph of central processing unit temperature of a resource-constrained over time will be provided in connection with FIG. 5.

In some embodiments, the systems described herein may conserve resources on a constrained device by downgrading a codec used to process a media stream. FIG. 1 is a block diagram of an exemplary system 100 for conserving resources on constrained devices. In one embodiment, and as will be described in greater detail below, a computing device 102 may be configured with an identification module 108 that may identify a media stream 118 on computing device 102. A detection module 110 may detect that a utilization, at least in part by media stream 118, of a hardware resource 114 on computing device 102 meets a predetermined threshold for hardware resource strain. In response to detecting that the utilization meets the predetermined threshold for hardware resource strain, a downgrade module 112 may reduce the utilization of hardware resource 114 by the media stream 118 by downgrading a codec 116 used by computing device 102 to process media stream 118.

Computing device 102 generally represents any type or form of resource-constrained computing device capable of reading computer-executable instructions. A resource-constrained computing device may be resource-constrained due to the device having limited resources for accomplishing computing tasks compared to other devices that would commonly accomplish those tasks, such as a smartphone, tablet, laptop, or desktop. For example, a resource-constrained computing device may have limited computational processing resources for encoding or decoding streaming media compared to other computing devices that commonly stream media. In some examples, a resource-constrained computing device may have constrained resources due to being relatively small in size compared to other computing devices, limiting resources such as surface area for heat dissipation, space for hardware processors, etc. For example, computing device 102 may represent a wearable device, such as a smartwatch, exercise monitor, chest strap, necklace, headband, anklet, and/or armband. Additional examples of computing device 102 may include, without limitation, any type or form of wearable device, mobile device, smart device, artificial reality device, personal digital assistant (PDA), etc.

Media stream 118 may generally represent any type or form of digital streaming media (e.g., media that is transmitted in segments forming a stream rather than media that is transmitted as a complete file). For example, media stream 118 may include a video stream. Additionally or alternatively, media stream 118 may include an audio stream. In some examples, media stream 118 may be a live media stream that is transmitted as it is captured. In some embodiments, media stream 118 may include a two-way communication between computing device 102 and another device, with audio and/or video captured by computing device 102 being transmitted to the other device and audio and/or video captured by the other device being transmitted to computing device 102.

Codec 116 generally represents any type or form of software, firmware, and/or hardware module capable of encoding and/or decoding audio and/or video. In some embodiments, codec 116 may represent a specific version of an audio and/or video codec with specified settings (e.g., enabled mode-sets). In some examples, the term "higher-complexity codec" may refer to a codec that consumes more computing resources (e.g., processor cycles, power, etc.) compared to a lower-complexity codec. In one example, a higher-complexity codec may encode and/or decode audio and/or video at a higher quality (e.g., resolution, bit rate, etc.) than a lower-complexity codec. The phrase "downgrading a codec" may generally refer to switching from a higher-complexity codec, version of a codec, and/or configuration for a codec to a lower-complexity codec, version of the codec, and/or configuration for the codec.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

FIG. 2 is a flow diagram of an exemplary method 200 for conserving resources on constrained devices. In some examples, at step 202, one or more of the systems described herein may identify a media stream on a resource-constrained device. For example, identification module 108 may, as part of computing device 102 in FIG. 1, identify media stream 118 on computing device 102.

Identification module 108 may identify the media stream in a variety of ways and/or contexts. For example, identification module 108 may monitor every media stream on the computing device. In some embodiments, identification module 108 may monitor media streams that have certain characteristics, such as video streams, audio streams, streams that consume a certain amount and/or percentage of computing resources (e.g., CPU cycles, battery power, thermal dissipation, etc.), streams that are processed by specific codecs (e.g., high-complexity codecs), and/or streams that are processed by certain applications (e.g., voice call applications, video streaming applications, social media applications, etc.).

At step 204, one or more of the systems described herein may detect that a utilization, at least in part by the media stream, of a hardware resource on the resource-constrained device meets a predetermined threshold for hardware resource strain. For example, detection module 110 may, as part of computing device 102 in FIG. 1, detect that a utilization, at least in part by media stream 118, of hardware resource 114 on computing device 102 meets a predetermined threshold for hardware resource strain.

The term "hardware resource strain" may generally refer to any utilization of a hardware resource that exceeds a threshold for utilization. For example, a hardware processor may reach a state of hardware resource strain at a high percentage of utilization (e.g., 95%, 99%, 100%, etc.). In another example, a device may reach a state of heat dissipation resource strain if the device is no longer able to dissipate heat quickly enough to prevent the temperature of the device from becoming high enough to cause damage to components of the device and/or damage or discomfort to a user of the device. In one example, a battery may reach a state of hardware resource strain if the remaining battery charge drops below a predetermined threshold for low power, such as 20%, 10%, or 5%.

Detection module 110 may detect that the utilization meets the threshold in a variety of ways. For example, detection module 110 may use one or more hardware sensors to detect the utilization. In one embodiment, detection module 110 may use one or more temperature sensors (e.g., thermometers) within the device to detect a temperature of the device and determine a strain on the heat dissipation capability of the device (e.g., the capacity of the device to dissipate heat quickly enough to offset the heat generated by various hardware components of the device, such as processors). In some embodiments, temperature sensors may be located throughout the device. For example, temperature sensors may be positioned close to a hardware processor, close to other temperature-sensitive components, and/or in contact with a user wearing the device. Additionally or alternatively, detection module 110 may use a firmware and/or software monitor to detect the utilization. For example, detection module 110 may receive information on the remaining battery charge of the device from a module that monitors the battery state.

In some embodiments, detection module 110 may detect whether utilization of a single resource meets a single threshold. In other embodiments, detection module 110 may track utilization of multiple resources and/or across multiple thresholds. For example, detection module 110 may detect whether a device's heat dissipation capability is mildly strained, moderately strained, or severely strained, based on the current temperature of the device. In another example, detection module 110 may track both the temperature and battery life of a device.

At step 206, in response to detecting that the utilization meets the predetermined threshold for hardware resource strain, the systems described herein may reduce the utilization of the hardware resource by the media stream by downgrading a codec used by the resource-constrained device to process the media stream. For example, downgrade module 112 may, as part of computing device 102 in FIG. 1, reduce the utilization of hardware resource 114 by media stream 118 by downgrading a codec 116 used by computing device 101 to process media stream 118.

Downgrade module 112 may downgrade the codec in a variety of ways. For example, downgrade module 112 may switch from a higher-complexity codec to a different, relatively lower-complexity codec that consumes fewer computing resources to process. In another example, downgrade module 112 may switch from a higher-complexity version of a codec to a lower-complexity version of the same codec. For example, downgrade module 112 may limit the data rate and/or mode-sets available to the codec, lowering the amount of computing resources needed to process the media stream with the codec. In some embodiments, by downgrading the codec, downgrade module 112 may reduce computing operations performed by and/or power consumption of one or more hardware processors processing the codec. In one example, downgrade module 112 may reduce computing operations by downgrading the codec to a lower-complexity codec by reducing the number of CPU cycles consumed by processing the lower-complexity codec.

Figure 3:
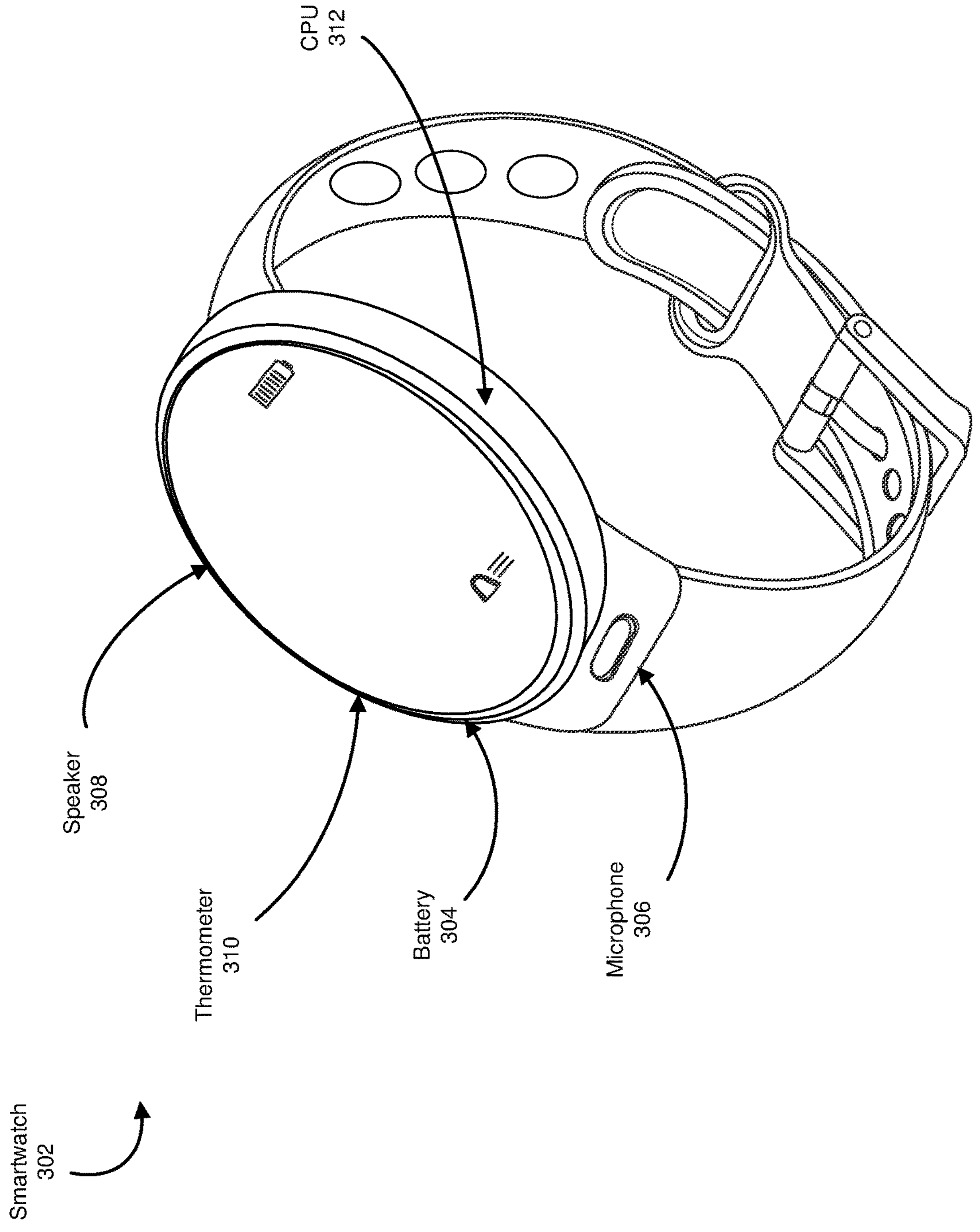
FIG. 3 is an illustration of an exemplary resource-constrained device.

In some embodiments, a resource-constrained device may be a wearable device. In some examples, the device may be resource-constrained at least in part because the device may have limited surface area to dissipate heat. For example, as illustrated in FIG. 3, a smartwatch 302 may enable a user to make audio calls via a microphone 306 and/or a speaker 308. In order to facilitate the audio call, a CPU 312 may process an audio stream of the call via a codec (e.g., decoding incoming audio and/or encoding outgoing audio). Processing the audio stream of the call may drain power from a battery 304 and/or may cause an increase in the temperature of CPU 312 and/or surrounding hardware elements that may be detected by a thermometer 310. In some examples, in order to reduce the heat generated by CPU 312 to a level which smartwatch 302 can safely dissipate (e.g., quickly enough to keep hardware components below a critical temperature for being damaged and/or causing discomfort for the user), the systems described herein may direct CPU 312 to process the audio stream via a less complex codec that consumes less processing power from CPU 312. Although described here as a CPU, the systems described herein may monitor the processing capacity and/or temperature of any relevant hardware component, including but not limited to any of the examples described above in connection with physical processor 130 in FIG. 1.

Figure 4:
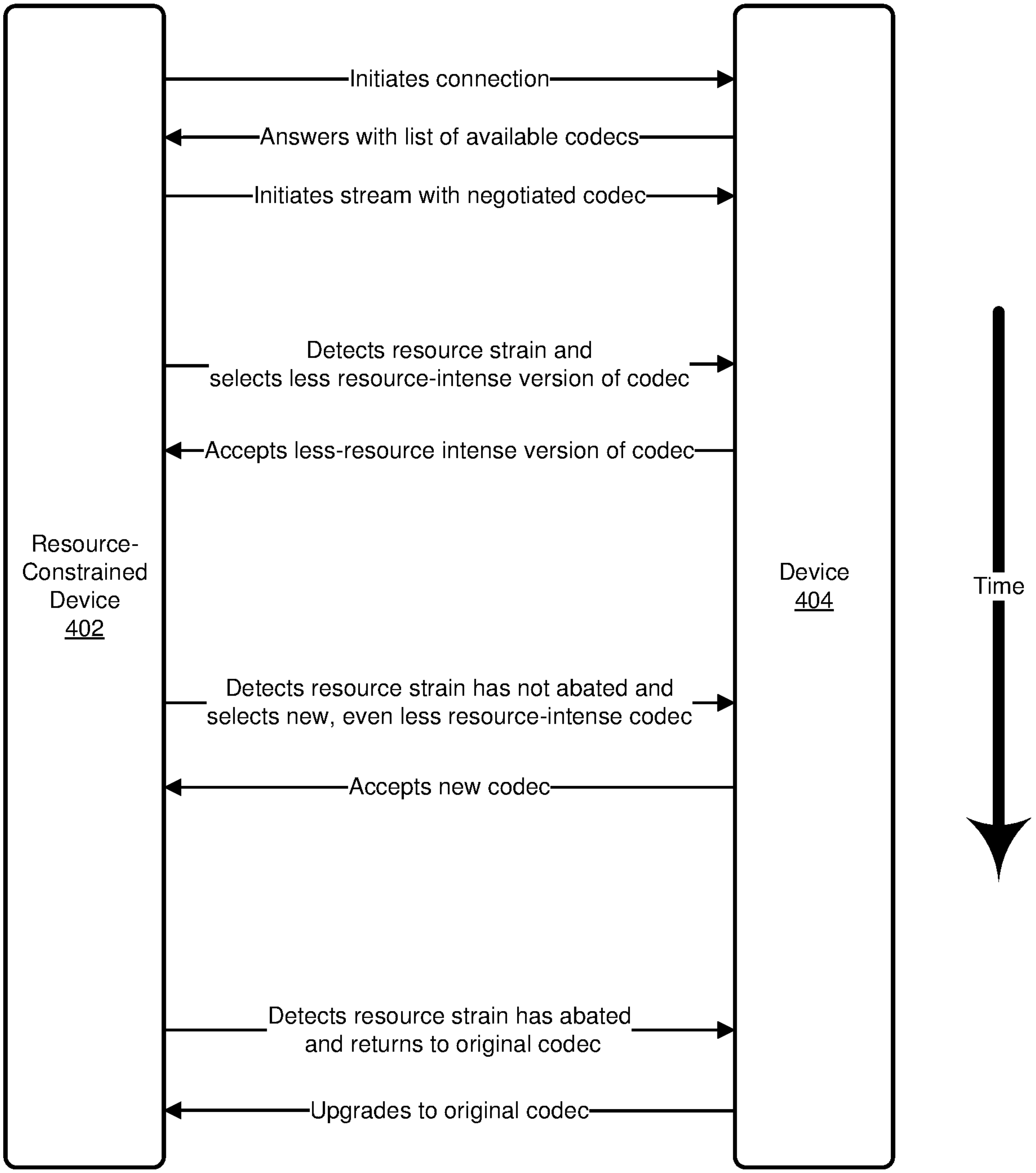
FIG. 4 is an illustration of an exemplary timeline of a connection between a resource-constrained device and an additional device.

In some examples, the systems described herein may downgrade and/or upgrade a codec used to process a media stream multiple times throughout the media stream based on current resource utilization levels on the resource-constrained device. For example, as illustrated in FIG. 4, a resource-constrained device 402 may initiate a connection to a device 404 for an audio call. Although illustrated as a direct connection, the connection may be via one or more networks (e.g., the Internet, a cellular network, one or more wi-fi networks, etc.). In one example, device 404 may answer with a list of available codecs for the audio call and resource-constrained device 402 may initiate a stream with a negotiated codec from the list. For example, resource-constrained device 402 may initiate a stream with an adaptive multi-rate wide-band (AMR-WB) codec with a data rate of 23.85 kilobits per second (kbps).

At some point during the call, the systems described herein may detect resource strain on resource-constrained device 402, prompting resource-constrained device 402 to select a less resource-intensive version of the codec (e.g., by limiting the available mode-sets to mode-sets with lower data rates). For example, resource-constrained device 402 may switch to an AMR-WB codec with a data rate of 15.85 kbps. In some examples, at a later time during the call, the systems described herein on resource-constrained device 402 may detect that the resource strain has not abated on resource-constrained device 402 and may select a different, even less resource-intense codec. For example, the systems described herein may select an adaptive multi-rate narrow-band (AMR-NB) codec that is less resource-intensive and/or lower-complexity than an AMR-WB codec.

In some examples, the systems described herein may detect that the resource strain on resource-constrained device 402 has abated and/or fallen below a threshold for excess resource capacity. The term "excess resource capacity" may generally refer to any state in which a component and/or capability of a device has capacity to perform its function (e.g., processing, heat dissipation, providing charge, etc.) in excess of what the component and/or capability is currently performing. In one embodiment, the systems described upgrade may then return to a higher-complexity codec, such as the original AMR-WB codec negotiated for the call with device 404.

Figure 5:
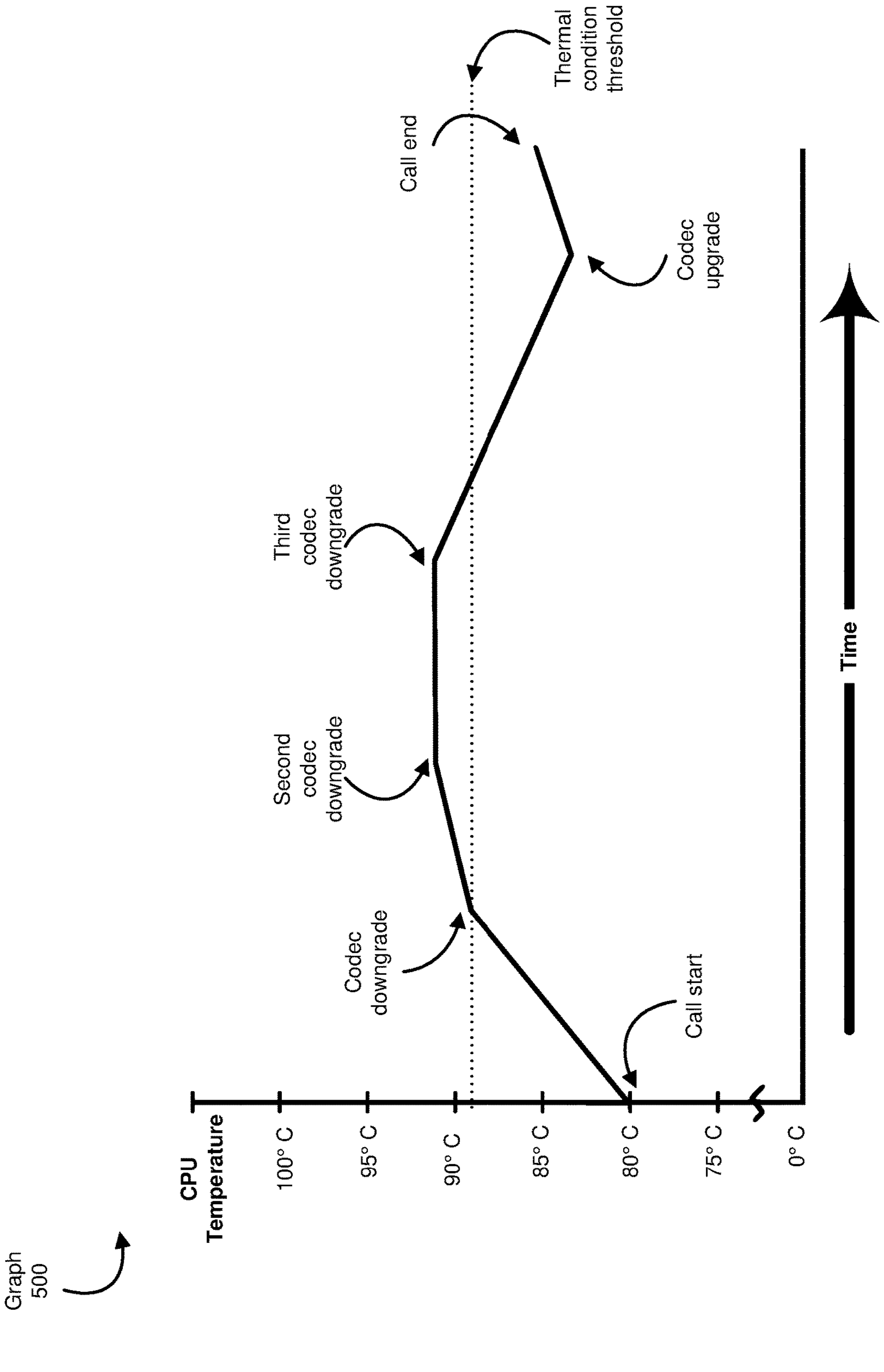
FIG. 5 is an illustration of an exemplary graph of resource strain on a resource-constrained device.

In some examples, the systems described herein may track resource utilization on a device over time and adjust the codec used to process a media stream based on multiple different resource and/or time thresholds. In some embodiments, the systems described herein may track thermal dissipation capacity via the current temperature of the device. For example, as illustrated in FIG. 5, graph 500 shows the CPU temperature of a resource-constrained device over time. At the start of a call, the device may have a CPU temperature of 80°. As the call progresses, the CPU temperature may rise until the CPU temperature passes a thermal condition threshold of 89°. At that point, the systems described herein may downgrade the codec used for the call. In one example, the CPU temperature may continue rising, but more slowly.

In some embodiments, the systems described herein may check the CPU temperature periodically (e.g., every ten seconds, every thirty seconds, every minute, etc.) and/or monitor additional thermal thresholds. Upon detecting that the device is still in the thermal condition (e.g., that the device has hit a time threshold for being in the thermal condition, such as one minute), the systems described herein may downgrade the codec a second time. In one example, this second downgrade may prevent the CPU temperature from increasing further but may not decrease the CPU temperature. In this example, after hitting an additional time threshold for being in the thermal condition (e.g., one minute since the most recent downgrade and/or two minutes since entering the thermal condition), the systems described herein may downgrade the codec a third time, enabling the CPU to cool and the device to exit the thermal condition. In some embodiments, the systems described herein may take additional thermal mitigation actions as various thresholds are hit. For example, the systems described herein may abort other processes that are consuming resources on the device.

At a later point during the call, the systems described herein may detect that the CPU temperature is low enough that the device has excess heat dissipation capacity, and may upgrade the codec (e.g., to any of the previous codecs used during the call). If the CPU temperature remains below the thermal condition threshold for the remainder of the call, the systems described herein may continue monitoring the CPU temperature but may not further adjust the codec.

As described above, the systems and methods described herein may enable a resource-constrained device to process a media stream without shutting down and/or suffering hardware damage due to insufficient resources, such as battery life or thermal dissipation capacity. In some examples, a user may initiate a media stream, such as an audio call, on a small device with limited resources, such as a smartwatch with a small battery and limited surface area to dissipate heat. As the audio call continues, the smartwatch may begin to overheat, threatening the integrity of the hardware and the safety of the user. The systems described herein may detect the overheating before it becomes dangerous to the device and/or user and may downgrade the codec used to process the call, slightly decreasing call quality but preserving the ability of the smartwatch to safely function. In some examples, the systems described herein may continue downgrading the codec as the call continues, decreasing the quality of longer calls over time in order to preserve user safety and comfort and device functionality.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 600 in FIG. 6) or that visually immerses a user in an artificial reality (such as, e.g., virtual-reality system 700 in FIG. 7). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
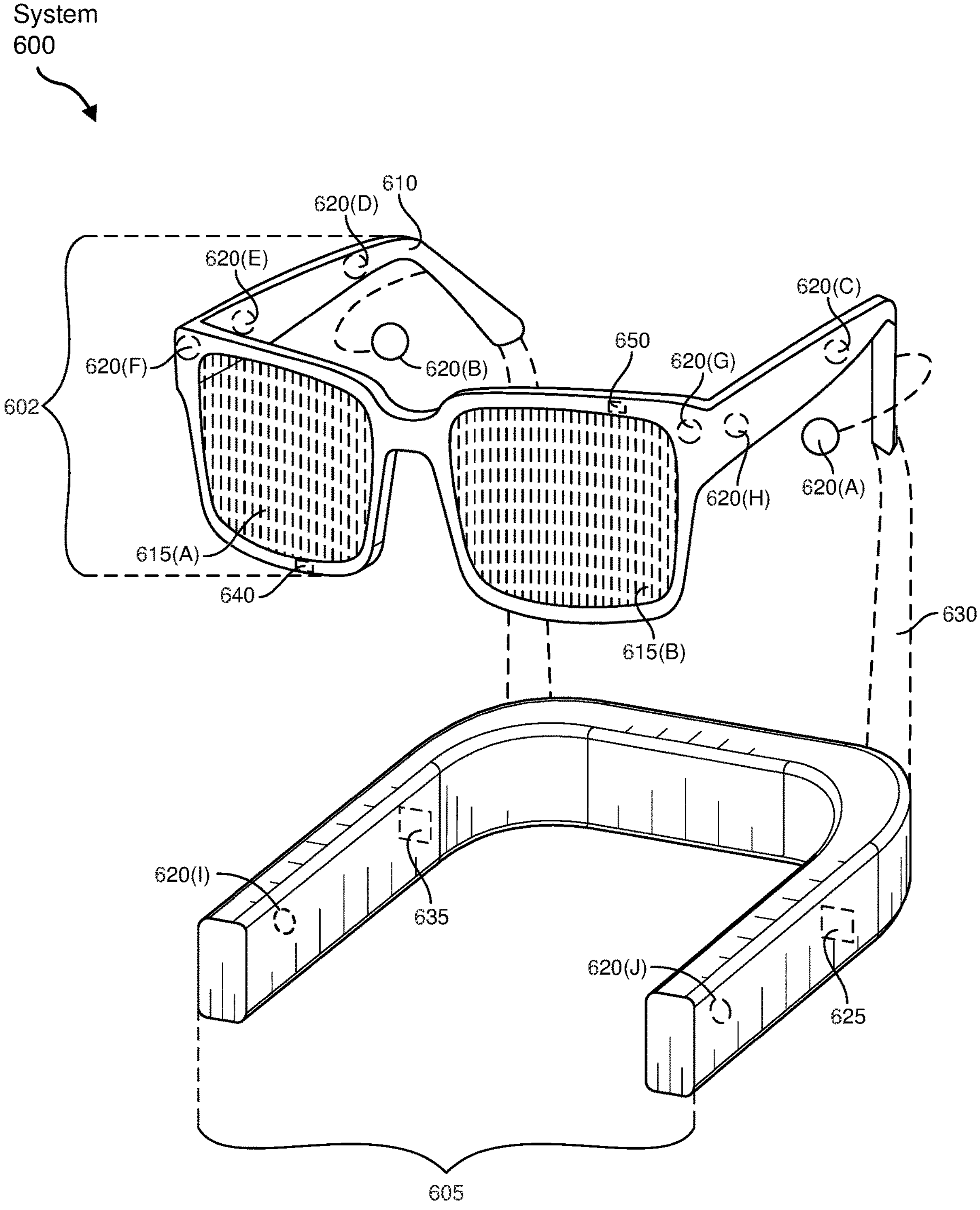
FIG. 6 is an illustration of exemplary augmented-reality glasses that may be used in connection with embodiments of this disclosure.
Figure 7:
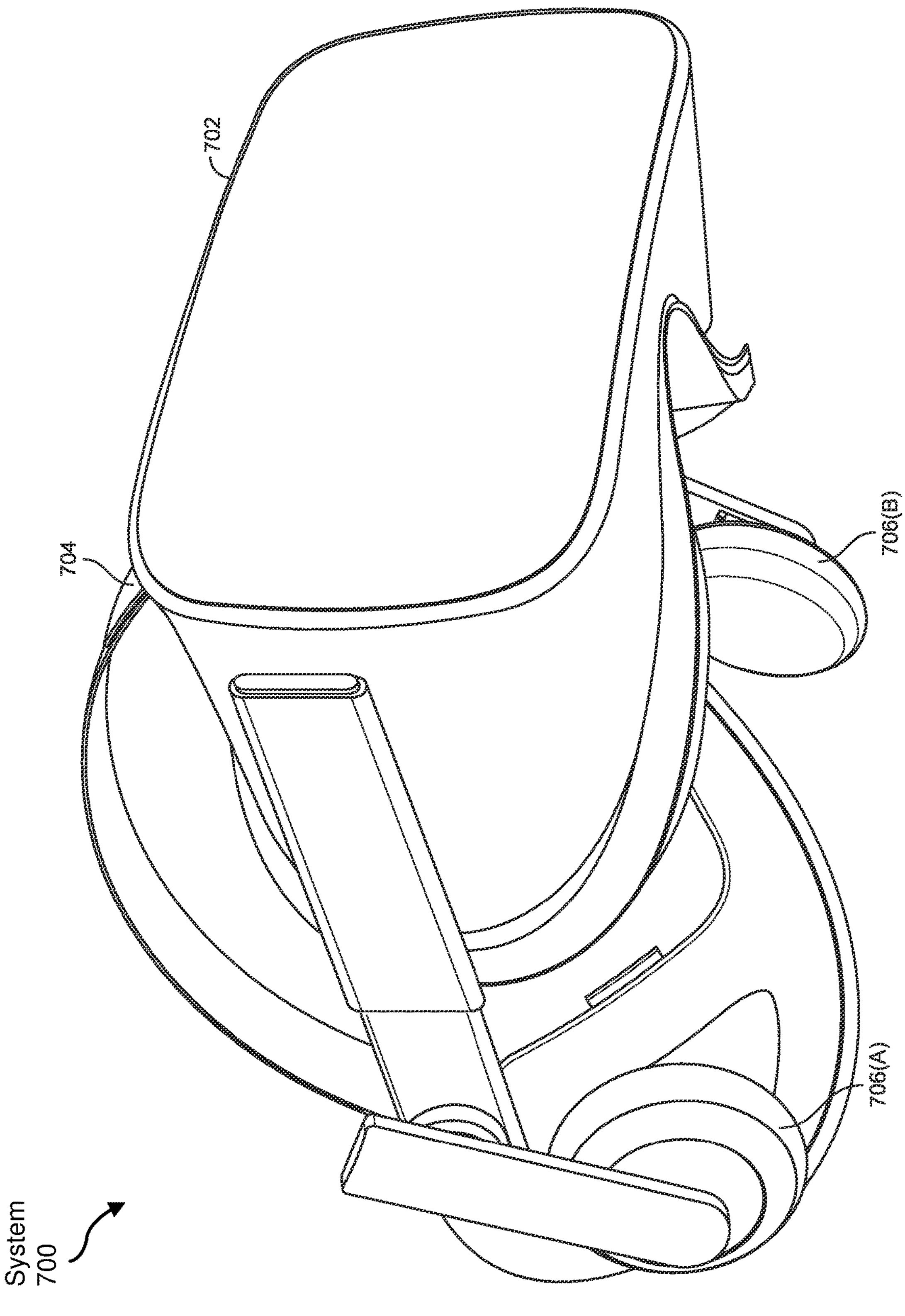
FIG. 7 is an illustration of an exemplary virtual-reality headset that may be used in connection with embodiments of this disclosure.

Turning to FIG. 6, augmented-reality system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While augmented-reality system 600 includes two displays, embodiments of this disclosure may be implemented in augmented-reality systems with a single NED or more than two NEDs.

In some embodiments, augmented-reality system 600 may include one or more sensors, such as sensor 640. Sensor 640 may generate measurement signals in response to motion of augmented-reality system 600 and may be located on substantially any portion of frame 610. Sensor 640 may represent one or more of a variety of different sensing mechanisms, such as a position sensor, an inertial measurement unit (IMU), a depth camera assembly, a structured light emitter and/or detector, or any combination thereof. In some embodiments, augmented-reality system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

In some examples, augmented-reality system 600 may also include a microphone array with a plurality of acoustic transducers 620(A)-620(J), referred to collectively as acoustic transducers 620. Acoustic transducers 620 may represent transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620(G), and 620(H), which may be positioned at various locations on frame 610, and/or acoustic transducers 620(I) and 620(J), which may be positioned on a corresponding neckband 605.

In some embodiments, one or more of acoustic transducers 620(A)-(J) may be used as output transducers (e.g., speakers). For example, acoustic transducers 620(A) and/or 620(B) may be earbuds or any other suitable type of headphone or speaker.

The configuration of acoustic transducers 620 of the microphone array may vary. While augmented-reality system 600 is shown in FIG. 6 as having ten acoustic transducers 620, the number of acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on frame 610, an orientation associated with each acoustic transducer 620, or some combination thereof.

Acoustic transducers 620(A) and 620(B) may be positioned on different parts of the user's ear, such as behind the pinna, behind the tragus, and/or within the auricle or fossa. Furthermore, there may be additional acoustic transducers 620 on or surrounding the ear in addition to acoustic transducers 620 inside the ear canal. Having an acoustic transducer 620 positioned next to an ear canal of a user may enable the microphone array to collect information on how sounds arrive at the ear canal. By positioning at least two of acoustic transducers 620 on either side of a user's head (e.g., as binaural microphones), augmented-reality system 600 may simulate binaural hearing and capture a 3D stereo sound field around about a user's head. In some embodiments, acoustic transducers 620(A) and 620(B) may be connected to augmented-reality system 600 via a wired connection 630, and in other embodiments acoustic transducers 620(A) and 620(B) may be connected to augmented-reality system 600 via a wireless connection (e.g., a BLUETOOTH connection). In still other embodiments, acoustic transducers 620(A) and 620(B) may not be used at all in conjunction with augmented-reality system 600.

Acoustic transducers 620 on frame 610 may be positioned in a variety of different ways, including along the length of the temples, across the bridge, above or below display devices 615(A) and 615(B), or some combination thereof. Acoustic transducers 620 may also be oriented such that the microphone array is able to detect sounds in a wide range of directions surrounding the user wearing the augmented-reality system 600. In some embodiments, an optimization process may be performed during manufacturing of augmented-reality system 600 to determine relative positioning of each acoustic transducer 620 in the microphone array.

In some examples, augmented-reality system 600 may include or be connected to an external device (e.g., a paired device), such as neckband 605. Neckband 605 generally represents any type or form of paired device. Thus, the following discussion of neckband 605 may also apply to various other paired devices, such as charging cases, smart watches, smart phones, wrist bands, other wearable devices, hand-held controllers, tablet computers, laptop computers, other external computer devices, etc.

As shown, neckband 605 may be coupled to eyewear device 602 via one or more connectors. The connectors may be wired or wireless and may include electrical and/or non-electrical (e.g., structural) components. In some cases, eyewear device 602 and neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of eyewear device 602 and neckband 605 may be located on one or more additional peripheral devices paired with eyewear device 602, neckband 605, or some combination thereof.

Pairing external devices, such as neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 605 may be communicatively coupled with eyewear device 602 and/or to other devices. These other devices may provide certain functions (e.g., tracking, localizing, depth mapping, processing, storage, etc.) to augmented-reality system 600. In the embodiment of FIG. 6, neckband 605 may include two acoustic transducers (e.g., 620(I) and 620(J)) that are part of the microphone array (or potentially form their own microphone subarray). Neckband 605 may also include a controller 625 and a power source 635.

Acoustic transducers 620(I) and 620(J) of neckband 605 may be configured to detect sound and convert the detected sound into an electronic format (analog or digital). In the embodiment of FIG. 6, acoustic transducers 620(I) and 620(J) may be positioned on neckband 605, thereby increasing the distance between the neckband acoustic transducers 620(I) and 620(J) and other acoustic transducers 620 positioned on eyewear device 602. In some cases, increasing the distance between acoustic transducers 620 of the microphone array may improve the accuracy of beamforming performed via the microphone array. For example, if a sound is detected by acoustic transducers 620(C) and 620(D) and the distance between acoustic transducers 620(C) and 620(D) is greater than, e.g., the distance between acoustic transducers 620(D) and 620(E), the determined source location of the detected sound may be more accurate than if the sound had been detected by acoustic transducers 620(D) and 620(E).

Controller 625 of neckband 605 may process information generated by the sensors on neckband 605 and/or augmented-reality system 600. For example, controller 625 may process information from the microphone array that describes sounds detected by the microphone array. For each detected sound, controller 625 may perform a direction-of-arrival (DOA) estimation to estimate a direction from which the detected sound arrived at the microphone array. As the microphone array detects sounds, controller 625 may populate an audio data set with the information. In embodiments in which augmented-reality system 600 includes an inertial measurement unit, controller 625 may compute all inertial and spatial calculations from the IMU located on eyewear device 602. A connector may convey information between augmented-reality system 600 and neckband 605 and between augmented-reality system 600 and controller 625. The information may be in the form of optical data, electrical data, wireless data, or any other transmittable data form. Moving the processing of information generated by augmented-reality system 600 to neckband 605 may reduce weight and heat in eyewear device 602, making it more comfortable for the user.

Power source 635 in neckband 605 may provide power to eyewear device 602 and/or to neckband 605. Power source 635 may include, without limitation, lithium-ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 700 in FIG. 7, that mostly or completely covers a user's field of view. Virtual-reality system 700 may include a front rigid body 702 and a band 704 shaped to fit around a user's head. Virtual-reality system 700 may also include output audio transducers 706(A) and 706(B). Furthermore, while not shown in FIG. 7, front rigid body 702 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 600 and/or virtual-reality system 700 may include one or more liquid crystal displays (LCDs), light emitting diode (LED) displays, microLED displays, organic LED (OLED) displays, digital light projector (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 600 and/or virtual-reality system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 600 and/or virtual-reality system 700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

EXAMPLE EMBODIMENTS

Example 1: A method for conserving resources on constrained devices may include (i) identifying a media stream on a resource-constrained device, (ii) detecting that a utilization, at least in part by the media stream, of a hardware resource on the resource-constrained device meets a predetermined threshold for hardware resource strain, and (iii) in response to detecting that the utilization meets the predetermined threshold for hardware resource strain, reducing the utilization of the hardware resource by the media stream by downgrading a codec used by the resource-constrained device to process the media stream.

Example 2: The computer-implemented method of example 1, where the hardware resource includes a heat dissipation capability of the resource-constrained device.

Example 3: The computer-implemented method of examples 1-2, where detecting that the utilization of the hardware resource meets the predetermined threshold for hardware resource strain includes detecting, via one or more temperature sensors, that a temperature of the resource-constrained device meets a predetermined threshold for overheating.

Example 4: The computer-implemented method of examples 1-3, where the resource-constrained device is resource-constrained at least in part due to having limited surface area to dissipate heat.

Example 5: The computer-implemented method of examples 1-4, where reducing the utilization of the hardware resource by the media stream by downgrading the codec includes reducing thermal output of a processor of the resource-constrained device by reducing computing operations performed by the processor via downgrading the codec.

Example 6: The computer-implemented method of examples 1-5, where the hardware resource includes remaining battery charge.

Example 7: The computer-implemented method of examples 1-6, where reducing the utilization of the hardware resource by the media stream by downgrading the codec includes reducing a power consumption of a processor of the resource-constrained device by reducing computing operations performed by the processor via downgrading the codec.

Example 8: The computer-implemented method of examples 1-7, where downgrading the codec includes switching from a higher-complexity version of a codec to a lower-complexity version of the same codec that produces less resource strain on the hardware resource than the higher-complexity version of the same codec.

Example 9: The computer-implemented method of examples 1-8, where downgrading the codec includes switching from a high-complexity codec to a comparatively low-complexity codec that produces less resource strain on the hardware resource than the high-complexity codec.

Example 10: The computer-implemented method of examples 1-9 may further include detecting that the utilization, at least in part by the media stream, of the hardware resource on the resource-constrained device meets an additional predetermined threshold for hardware resource strain and in response to detecting that the utilization meets the additional predetermined threshold for hardware resource strain, further reducing the utilization of the hardware resource by the media stream by further downgrading the codec used by the resource-constrained device to process the media stream.

Example 11: The computer-implemented method of examples 1-10 may further include detecting that the utilization, at least in part by the media stream, of the hardware resource on the resource-constrained device meets a predetermined threshold for excess resource capacity and in response to detecting that the utilization meets the predetermined threshold for excess resource capacity, upgrading the codec used by the resource-constrained device to process the media stream.

Example 12: The computer-implemented method of examples 1-11, where the resource-constrained device includes a wearable device.

Example 13: The computer-implemented method of examples 1-12, where the codec includes an audio codec.

Example 14: The computer-implemented method of examples 1-13, where the media stream includes an audio call.

Example 15: A system for conserving resources on constrained devices may include at least one physical processor and physical memory including computer-executable instructions that, when executed by the physical processor, cause the physical processor to (i) identify a media stream on a resource-constrained device, (ii) detect that a utilization, at least in part by the media stream, of a hardware resource on the resource-constrained device meets a predetermined threshold for hardware resource strain, and (iii) in response to detecting that the utilization meets the predetermined threshold for hardware resource strain, reduce the utilization of the hardware resource by the media stream by downgrading a codec used by the resource-constrained device to process the media stream.

Example 16: The system of example 15, where the hardware resource includes a heat dissipation capability of the resource-constrained device.

Example 17: The system of examples 15-16, where detecting that the utilization of the hardware resource meets the predetermined threshold for hardware resource strain includes detecting, via one or more temperature sensors, that a temperature of the resource-constrained device meets a predetermined threshold for overheating.

Example 18: The system of examples 15-17, where the resource-constrained device is resource-constrained at least in part due to having limited surface area to dissipate heat.

Example 19: The system of examples 15-18, where reducing the utilization of the hardware resource by the media stream by downgrading the codec includes reducing thermal output of a processor of the resource-constrained device by reducing computing operations performed by the processor via downgrading the codec.

Example 20: A non-transitory computer-readable medium may include one or more computer-readable instructions that, when executed by at least one processor of a computing device, cause the computing device to (i) identify a media stream on a resource-constrained device, (ii) detect that a utilization, at least in part by the media stream, of a hardware resource on the resource-constrained device meets a predetermined threshold for hardware resource strain, and (iii) in response to detecting that the utilization meets the predetermined threshold for hardware resource strain, reduce the utilization of the hardware resource by the media stream by downgrading a codec used by the resource-constrained device to process the media stream.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Discs (CDs), Digital Video Discs (DVDs), and BLU-RAY discs), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

initiating, via a resource-constrained device, a connection with an augmented-reality system, wherein the resource-constrained device comprises a wrist-wearable device;

receiving, from the augmented-reality system, information identifying one or more available codecs including a high-complexity codec and a low-complexity codec;

identifying, via the resource-constrained device, the high-complexity codec to use for a media stream between the resource-constrained device and the augmented-reality system;

initiating, via the resource-constrained device, a media stream using the high-complexity codec;

detecting that a utilization, at least in part by the media stream using the high-complexity codec, of a hardware resource on the resource-constrained device meets a predetermined threshold for hardware resource strain; and in response to detecting that the utilization meets the predetermined threshold for hardware resource strain, reducing the utilization of the hardware resource by the media stream by downgrading from the high-complexity codec used by the resource-constrained device to the low-complexity codec to process the media stream.

2. The computer-implemented method of claim 1, wherein the hardware resource comprises a heat dissipation capability of the resource-constrained device.

3. The computer-implemented method of claim 2, wherein detecting that the utilization of the hardware resource meets the predetermined threshold for hardware resource strain comprises detecting, via one or more temperature sensors, that a temperature of the resource-constrained device meets a predetermined threshold for overheating.

4. The computer-implemented method of claim 2, wherein the resource-constrained device is resource-constrained at least in part due to having limited surface area to dissipate heat.

5. The computer-implemented method of claim 2, wherein reducing the utilization of the hardware resource by the media stream by downgrading from the high-complexity codec comprises reducing thermal output of a processor of the resource-constrained device by reducing computing operations performed by the processor via downgrading the high-complexity codec.

6. The computer-implemented method of claim 1, wherein the hardware resource comprises remaining battery charge.

7. The computer-implemented method of claim 6, wherein reducing the utilization of the hardware resource by the media stream by downgrading from the high-complexity codec comprises reducing a power consumption of a processor of the resource-constrained device by reducing computing operations performed by the processor via downgrading from the high-complexity codec.

8. The computer-implemented method of claim 1, wherein downgrading from the high-complexity codec comprises switching from a higher-complexity version of a codec to a lower-complexity version of the same codec that produces less resource strain on the hardware resource than the higher-complexity version of the same codec.

9. The computer-implemented method of claim 1, wherein downgrading from the high-complexity codec comprises switching from the high-complexity codec to the comparatively low-complexity codec that produces less resource strain on the hardware resource than the high-complexity codec.

10. The computer-implemented method of claim 1, further comprising:

detecting that the utilization, at least in part by the media stream, of the hardware resource on the resource-constrained device meets an additional predetermined threshold for hardware resource strain; and in response to detecting that the utilization meets the additional predetermined threshold for hardware resource strain, further reducing the utilization of the hardware resource by the media stream by further downgrading from the low-complexity codec used by the resource-constrained device to process the media stream.

11. The computer-implemented method of claim 1, further comprising:

detecting that the utilization, at least in part by the media stream, of the hardware resource on the resource-constrained device meets a predetermined threshold for excess resource capacity; and in response to detecting that the utilization meets the predetermined threshold for excess resource capacity, upgrading from the low-complexity codec used by the resource-constrained device to process the media stream.

12. The computer-implemented method of claim 1, wherein the high-complexity codec comprises an audio codec.

13. The computer-implemented method of claim 1, wherein the media stream comprises an audio call, wherein audio associated with the audio call is captured via one or more microphones and output via one or more speakers of the resource-constrained device.

14. A system comprising:

at least one physical processor configured to:

initiate, via a resource-constrained device, a connection with an augmented-reality system, wherein the resource-constrained device comprises a wrist-wearable device;

receive, from the augmented-reality system, information identifying one or more available codecs including a high-complexity codec and a low-complexity codec;

identify, via the resource-constrained device, the high-complexity codec to use for a media stream between the resource-constrained device and the augmented-reality system;

initiate, via the resource-constrained device, a media stream using the high-complexity codec;

detect that a utilization, at least in part by the media stream using the high-complexity codec, of a hardware resource on the resource-constrained device meets a predetermined threshold for hardware resource strain; and in response to detecting that the utilization meets the predetermined threshold for hardware resource strain, reduce the utilization of the hardware resource by the media stream by downgrading from the high-complexity codec used by the resource-constrained device to the low-complexity codec to process the media stream.

15. The system of claim 14, wherein the hardware resource comprises a heat dissipation capability of the resource-constrained device.

16. The system of claim 15, wherein detecting that the utilization of the hardware resource meets the predetermined threshold for hardware resource strain comprises detecting, via one or more temperature sensors, that a temperature of the resource-constrained device meets a predetermined threshold for overheating.

17. The system of claim 15, wherein the resource-constrained device is resource-constrained at least in part due to having limited surface area to dissipate heat.

18. The system of claim 15, wherein reducing the utilization of the hardware resource by the media stream by downgrading from the high-complexity codec comprises reducing thermal output of a processor of the resource-constrained device by reducing computing operations performed by the processor via downgrading from the high-complexity codec.

19. A non-transitory computer-readable medium comprising one or more computer-readable instructions that, when executed by at least one processor of a computing device, cause the computing device to:

initiate, via a resource-constrained device, a connection with an augmented-reality system, wherein the resource-constrained device comprises a wrist-wearable device;

receive, from the augmented-reality system, information identifying one or more available codecs including a high-complexity codec and a low-complexity codec;

identify, via the resource-constrained device, the high-complexity codec to use for a media stream between the resource-constrained device and the augmented-reality system;

initiate, via the resource-constrained device, a media stream using the high-complexity codec;

detect that a utilization, at least in part by the media stream using the high-complexity codec, of a hardware resource on the resource-constrained device meets a predetermined threshold for hardware resource strain; and in response to detecting that the utilization meets the predetermined threshold for hardware resource strain, reduce the utilization of the hardware resource by the media stream by downgrading from the high-complexity codec used by the resource-constrained device to a the low-complexity codec to process the media stream.

* * * * *